United States Patent Office 3,380,972
Patented Apr. 30, 1968

3,380,972
POLYMERIZATION PROCESS
John R. Le Blanc, Wilbraham, and Joel Fantl, Springfield, Mass., assignors to Monsanto Company, St. Louis, Mo., a corporation of Delaware
No Drawing. Continuation-in-part of application Ser. No. 162,957, Dec. 28, 1961. This application July 12, 1965, Ser. No. 471,466
17 Claims. (Cl. 260—78.5)

ABSTRACT OF THE DISCLOSURE

Disclosed herein is a novel process by which maleic monomer is heated to a temperature of at least 100° C. and vinylidene monomer is slowly added thereto with agitation while maintaining in the reaction mixture a specified concentration of a free radical generating polymerization initiator and a specified concentration of a molecular weight regulator which corresponds to the formula:

wherein R is a cyclic organic radical to which

is joined at a carbon atom of an alicyclic ring having at least four members, and wherein R' and R'' are independently selected from the group consisting of hydrogen and an alkyl radical.

---

This invention is a continuation-in-part of copending application S.N. 162,957, filed Dec. 28, 1961, now abandoned, and relates to a mass polymerization process and more particularly to a mass polymerization process for preparing water soluble, low molecular weight interpolymers of a maleic monomer and a vinylidene monomer interpolymerizable therewith, typically interpolymers of maleic anhydride and styrene.

There is growing interest in water soluble, low molecular weight interpolymers of maleic monomers such as maleic anhydride, maleic acid and half esters of maleic acid. In particular, there is growing interest in water soluble interpolymers of styrene and maleic anhydride which have molecular weights of less than 10,000. Heretofore, to prepare such low molecular weight interpolymers of maleic monomers it has been necessary to prepare such interpolymers by solution polymerization processes, which processes are relatively costly. It would be desirable to have available to the art alternate low cost processes for preparing such low molecular weight interpolymers of maleic monomers and in particular it would be desirable to have available a mass polymerization process for preparing such water soluble, low molecular weight interpolymers.

It is an object of this invention to provide a novel process for preparing water soluble, low molecular weight interpolymers of maleic monomers.

A further object of this invention is to provide a novel mass polymerization process for preparing water soluble low molecular weight interpolymers of maleic monomers.

Other objects and advantages of this invention will be apparent from the following detailed description thereof.

The above and related objects are attained by a novel process in which the maleic monomer is heated to a temperature of at least 100° C. and the vinylidene monomer is slowly added thereto with agitation while maintaining in the reaction mixture a specified concentration of a free radical generating polymerization initiator and a specified concentration of a molecular weight regulator which corresponds to the formula:

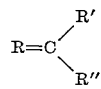

wherein R is a cyclic organic radical to which =CR'R'' is joined at a carbon atom of an alicyclic ring having at least 4 members, and wherein R' and R'' are independently selected from the group consisting of hydrogen and an alkyl radical.

The following examples are set forth to illustrate more clearly the principle and practice of this invention to those skilled in the art. Where parts or quantities are mentioned, they are parts or quantities by weight.

Example I

To a stirred reaction vessel equipped with a dropping funnel are charged 81 parts (0.62 mol) of methyl acid maleate and 1.6 parts of terpinolene. The reaction mixture is heated to a temperature of 105–108° C. and there is added thereto with agitation 66 parts (0.63 mol) of styrene having dissolved therein 1.6 parts of terpinolene, 0.5 part of beta-nitrostyrene, 0.7 part of benzoyl peroxide and 0.2 part of di-tertiary butyl peroxide. The addition of the styrene monomer solution to the maleic monomer is made at a slow continuous rate over a period of 2 hours, this rate of styrene monomer addition being approximately twice the rate at which the styrene monomer in the reaction vessel is being polymerized. The resulting reaction mixture is then transferred to a sealed reaction vessel and heated for 2 hours at 110–130° C. and finally for 5 hours at 130° C. The specific viscosity of a 15% solution of the resulting interpolymer composition in methyl ethyl ketone is 7.7. The reaction mixture is completely soluble in a 28% aqueous ammonium hydroxide solution.

Example II

To a stirred vessel are charged 49 parts (0.5 mol) of maleic anhydride, 86 parts (0.5 mol) sec-butyl acid maleate and 3.0 parts of terpinolene. The mixture is heated to 100° C. and 104 parts (1.0 mol) of styrene together with 1.8 parts of di-t- butyl peroxide and 9.0 parts of terpinolene are added gradually over a 2.5 hour period. The mixture is transferred to a suitable reaction vessel where the polymerization is finished at 100–150° C. over an additional 7 hours. The specific viscosity of a 15% solution of polymer composition in methyl ethyl ketone is 4.6 and the interpolymer is completely soluble in aqueous ammonia. The fact that the interpolymer is completely soluble in aqueous ammonia indicates that the terpinolene is chemically combined in the polymer product.

Example III

The same procedure is used as in Examples I and II except that 78.4 parts of maleic anhydride, 173 parts of butyl Cellosolve [1] acid maleate and 51 parts of terpinolene are charged to the reactor and 166 parts of styrene and 4.0 parts of di-t-butyl peroxide are added gradually to the maleic monomers over a 3 hour period. After completing the polymerization a polymer composition with a specific viscosity of 1.9 and a number average molecular weight of 1200 is obtained. A homogeneous ---
[1] Butyl Cellosolve is the mono-n-butyl ether of ethylene glycol.

polymer solution of borderline water solubility is prepared by dissolving 40 parts of the reaction mixture in 22 parts of 28% ammonium hydroxide and 38 parts of water. The Brookfield viscosity of this solution is 52 poises.

Example IV 70.5 parts of s-butyl acid maleate, 93.5 parts of 2-ethyl-hexyl acid maleate, 17 parts of terpinolene, 85.3 parts of styrene and 2.0 parts of di-t-butyl peroxide are allowed to react as in Example III. An interpolymer composition with a specific viscosity of 1.7 and a number average molecular weight of 100 is obtained. The reaction mixture is completely soluble in a 28% aqueous ammonium hydroxide solution.

Example V 98 parts of maleic anhydride, 104 parts of styrene, 1.8 parts di-t-butyl peroxide and 10 parts of terpinolene are allowed to interpolymerize as in Example III. An interpolymer composition with a specific viscosity of 7.7 is obtained. The reaction mixture is completely soluble in a 28% aqueous ammonium hydroxide solution.

Example VI

This example illustrates that more than 1 mol. of styrene per mol of maleic acid derivative can be used.

93.5 parts of 2-ethylhexyl acid maleate, 70.5 parts of isobutyl acid maleate and 23 parts of terpinolene are charged to a stirred kettle. 119 parts of styrene (40 mol percent excess) and 2.8 parts of di-t-butyl peroxide are added over 3 hours. The reaction is stirred for 7 hours total at 125–150° C. to complete polymerization. The interpolymer composition has a specific viscosity of 1.9. The reaction product is completely soluble in a 28% aqueous ammonium hydroxide solution.

The process of the invention is carried out in such a manner that the maleic monomer and the vinylidene monomer are interpolymerized at a temperature of at least 100° C. (and below the decomposition temperature of the interpolymer being formed) and in the presence of at least minimum specified concentrations of a free radical generating polymerization initiator and a molecular weight regulator of a specified chemical type. In addition, in at least the initial stages of the polymerization, i.e., in the period in which at least the first 20 mol percent of the maleic monomer has polymerized, the maleic monomer is present in massive excess of the vinylidene monomer in the polymerization zone. By massive excess is meant a mol ratio of at least 5:1. Stated in another way, the concentration of the vinylidene monomer in the reaction medium will be relatively low.

To establish such reaction conditions, at least a substantial portion and preferably all of the maleic monomer is initially charged to the reaction vessel and heated to a temperature of at least 100° C. The maleic monomer is then stirred and the vinylidene monomer is added thereto at a slow uniform rate. Specifically, the vinylidene monomer is added to the reaction zone at a rate not greater than 5 times the rate at which the added vinylidene monomer is being polymerized. In a preferred embodiment of the invention the vinylidene monomer is added at a rate not more than twice the rate at which the vinylidene monomer is being polymerized and more especially at a rate substantially equal to the rate at which the added vinylidene monomer is being polymerized. The rate at which the vinylidene monomer is charged to the reaction zones assures that the maleic monomer will be present in massive excess of the vinylidene monomer throughout a substantial portion of the polymerization reaction.

When the polymerization is run by adding the vinylidene monomer to the maleic monomer at substantially the rate at which the added vinylidene monomer is being polymerized, the entire polymerization will be run in a stirred reaction vessel. When the vinylidene monomer is added to the maleic monomer at a rate faster than the added vinylidene monomer is being polymerized, the reaction mixture can be transferred to an unstirred reactor after the addition of the vinylidene monomer is completed. When such a transfer in reaction vessel is made, it usually will be made after 30 or preferably 50 mol percent or more of the total monomers have polymerized.

It will be noted that no solvent is used in the process of this invention, nor is any monomer present in excess to serve as a solvent. Thus, the present process is a true mass polymerization process and is not to be confused with solution polymerization process of the prior art, as represented by Lundquist, U.S. 2,383,399.

The reaction is carried out under conditions such that the free radical generating polymerization initiator is present in the polymerization reaction in the amount of at least about 0.5% and preferably in the amount of about 0.5–10% and more especially 1.0–4.0%, based upon the vinylidene monomer that has been added to the maleic monomer. Typical examples of the free radical generating polymerization initiators which may be employed include benzoyl peroxide, ditertiary butyl peroxide, tertiary butyl hydroperoxide, lauroyl peroxide, tertiary butyl perbenzoate, tertiary butyl peracetate, azoisobutyronitrile, cumene hydroperoxide, etc.

The reaction is also carried out in the presence of a specific type of molecular rate regulator which is present in the reaction mixture in the amount of at least about 0.5% and preferably in the amount of at least about 0.5–30% and more especially 5–20%, based upon the vinylidene monomer that has been added to the maleic monomer. This upper limit of 30% of molecular weight regulator based upon the vinylidene monomer has been found to be about the maximum at which water soluble reaction products occur. When this limit is exceeded the products are at least partially water insoluble and, thus, commercially unacceptable.

The free radical generating polymerization initiator and the molecular weight regulator may be initially charged to the reaction with the maleic monomer, may be added to the polymerization with the vinylidene monomer or may be split therebetween. Preferably, a substantial portion and optionally all of the molecular weight regulator required in the reaction is charged with the maleic monomer and the free radical generating polymerization initiator is charged to the polymerization reaction with the vinylidene monomer.

The molecular weight regulators employed in the process of the invention conform to the formula:

wherein R is a cyclic organic radical to which =CR'R" is joined at a carbon atom of an alicyclic ring having at least 4 members, and wherein R' and R" are independently selected from the group consisting of hydrogen and an alkyl radical.

Exemplary of utilizable molecular weight regulators are methylene cyclobutane, methylene cyclopentane, caryophyliene, pulegone, terpinolene, beta-terpinene, pseudolimonene, beta-phellandrene, 1(7), -4(8)-p-menthadiene, 2,4(8)-p-menthadiene, sabinene, beta-pinene, camphene, alpha-fenchene, beta-fenchene, and mixtures thereof, as well as many other compounds which satisfy the requirement of corresponding to the above formula, especially the compounds wherein R' and R" of the formula represent hydrogen or a methyl group.

The preferred molecular weight regulators are cyclic terpenes which contain a 6-membered alicyclic ring, monocyclic terpenes being especially preferred. Although such cyclic terpenes can advantageously be employed in the form of commercial terpene mixtures, it is usually preferred to avoid using commercial terpene mixtures wherein the molecular weight regulator of the invention is contaminated by any substantial amount of impurities other than unsaturated cyclic terpenes. Other impurities can be present without destroying the effectiveness of the molecular weight regulator, but they may cause undesirable effects, such as foaming. If desired, other types of molecular weight regulators such as beta-nitrostyrene and mercaptans can be used in conjunction with the primary molecular weight regulators.

The maleic monomers employed in the practice of the invention are selected from the group consisting of maleic anhydride, maleic acid and half esters of maleic acid and a 1–18 carbon atom monohydric alcohol. Typical examples of such monomers, in addition to maleic anhydride and maleic acid, include methyl acid maleate, secondary butyl acid maleate, butyl Cellosolve acid maleate, 2-ethylhexyl acid maleate, octadecyl acid maleate, etc. In one embodiment of the invention, the maleic monomer polymerized will consist of a mixture of methyl acid maleate and secondary butyl acid maleate in which the secondary butyl acid maleate constitutes in excess of 50 weight percent of the mixture.

The vinylidene monomers employed in the process of the invention can be any of the vinylidene monomers which are known to polymerize with maleic monomers of the type described in the paragraph above. Typical vinylidene monomers that can be employed include vinyl esters of organic and inorganic acid such as vinyl acetate, vinyl stearate, vinyl chloride; vinylidene aromatic compounds such as styrene, vinyl naphthalene and the ring-alkyl and ring-halogen substituted derivatives thereof, e.g., vinyl toluene, vinyl xylene, 2,4-dimethylstyrene, chlorostyrene, 2,5 - dichlorostyrene, 2-methyl-4-chlorostyrene, etc.; vinyl alkyl ethers, e.g., vinyl methyl ether, vinyl isobutyl ether, etc., vinylidene heterocyclic compounds such as vinyl pyridine, etc., and mixtures of two or more of said vinylidene monomers. When the vinylidene monomer employed has an atmospheric boiling point of less than 100° C., it is obvious that the reaction will have to be run in a sealed pressure-resistant autoclave.

The maleic monomer and the vinylidene monomer will be employed in the ratio of 1–2 and preferably 1–1.5 molar portions of the vinylidene monomer per molar portion of the maleic monomer. In an especially preferred embodiment of the invention the vinylidene monomer and the maleic monomer will be employed in an essentially equimolar ratio.

Depending upon the reaction temperature, the concentration of the free radical generating polymerization initiator, and the concentration of the molecular weight regulator it is possible to prepare interpolymers of maleic monomers which have a number average molecular weight of less than 10,000 and in some cases molecular weight as low as 1,000 or even slightly less. As is known in the art, interpolymers of maleic monomers having molecular weight in this range have utility for a number of purposes, particularly in the preparation of coating compositions.

The molecular weight regulators employed in the process of the invention contain olefinic unsaturation and it is believed that, to a degree at least, the molecular weight modifier actually interpolymerizes with the maleic monomer and/or the vinylidene monomer. This belief is strengthened by the observation that the polymeric products obtained by the process of the invention are completely soluble in aqueous ammonia. If any substantial quantity of the molecular weight regulator were present in a free-form it would be insoluble in the aqueous ammonia. Thus, in all probability, the polymeric products obtained by the process of the invention are either terpolymers of the maleic monomer, the vinylidene monomer and the molecular weight regulator and/or a blend of (1) an interpolymer of the maleic monomer and the vinylidene monomer and (2) an interpolymer of the maleic monomer and the molecular weight regulator. It is also possible that an additional component of the polymeric product may be an adduct formed between the maleic monomer and the molecular weight regulator. Formulas I and II below illustrate the most probable structures of such adducts when the molecular weight regulator is terpinolene.

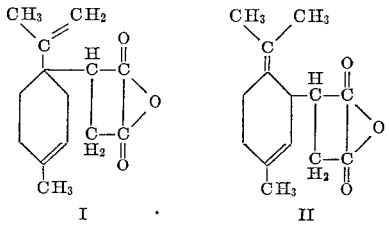

The above descriptions and particularly the examples are set forth by way of illustration only. Many other variations and modifications thereof will be obvious to those skilled in the art and can be made without departing from the spirit and scope of the invention herein described.

What is claimed is:

1. In a mass polymerization process for preparing a water soluble, low molecular weight interpolymer from a mixture of 1 molar portion of a maleic monomer of the group consisting of maleic anhydride, maleic acid, half esters of maleic acid and a 1–18 carbon atom monohydric alcohol, and mixtures thereof, and 1–2 molar portions of at least 1 vinylidene monomer interpolymerizable with said maleic monomer, the improvement which consists essentially of (1) heating the maleic monomer to a temperature of at least 100° C., (2) agitating the maleic monomer, (3) adding the vinylidene monomer to the maleic monomer at a rate not more than about 5 times the rate at which the added vinylidene monomer is being polymerized, (4) maintaining in the reaction mixture throughout the period of the addition of the vinylidene monomer at least about 0.5% by weight of a free radical generating polymerization initiator and from 0.5 to 30% by weight of a molecular weight regulator, both of said percentages being based upon the vinylidene monomer that has been added to the maleic monomer, and (5) maintaining the reaction mixture at a temperature of at least 100° C. until essentially all of the maleic monomer and the vinylidene monomer have polymerized; said molecular weight regulator corresponding to the formula:

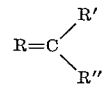

wherein R is a cyclic organic radical to which $=CR'R''$ is joined at a carbon atom of an alicyclic ring having at least 4 members, and wherein R' and R'' are independently selected from the group consisting of hydrogen and n alkyl radical.

2. In a mass polymerization process for preparing a water soluble low molecular weight interpolymer from a mixture of 1 molar portion of a maleic monomer of the group consisting of maleic anhydride, maleic acid, half esters of maleic acid and a 1–18 carbon atom monohydric alcohol, and mixtures thereof, and 1–1.5 molar portions of at least one vinylidene monomer interpolymerizable with said maleic monomer, the improvement which consists essentially of (1) heating the maleic monomer to a temperature of at least 100° C., (2) agitating the maleic monomer, (3) adding the vinylidene monomer to the maleic monomer at a rate not more than about 5 times the rate at which the added vinylidene monomer is being polymerized, (4) maintaining in the reaction mixture throughout the period of addition of the vinylidene monomer about 1.0–4.0% by weight of a free radical generating polymerization initiator and about 5–20% by weight of a molecular weight regulator, both of said percentages being based upon the vinylidene monomer that has been added to the maleic monomer, and (5) maintaining the reaction mixture at a temperature of at least 100° C.

until essentially all of the maleic monomer and the vinylidene monomer have polymerized; said molecular weight regulator corresponding to the formula:

wherein R is a cyclic organic radical to which =CR'R" is joined at a carbon atom of a alicyclic ring having at least 4 members, and wherein R and R" are independently selected from the group consisting of hydrogen and an alkyl radical.

3. The process of claim 2 in which the molecular weight regulator is terpinolene.

4. A process of claim 2 in which the maleic monomer is maleic anhydride and the vinylidene monomer is styrene.

5. The process of claim 2 in which the maleic monomer is at least one half ester of maleic acid and a 1–18 carbon atom monohydric alcohol and the vinylidene monomer is styrene.

6. The process of claim 5 in which the maleic monomer is methyl acid maleate.

7. The process of claim 5 in which the maleic monomer is a mixture of methyl acid maleate and secondary butyl acid maleate.

8. The process of claim 5 in which the maleic monomer is the half ester of maleic acid and the mono-n-butyl ether of ethylene glycol.

9. In a mass polymerization process for preparing a water soluble low molecular weight interpolymer from a mixture of 1 molar portion of a maleic monomer of the group consisting of maleic anhydride, maleic acid, a half ester of maleic acid and a 1–18 carbon atom monohydric alcohol, and mixtures thereof and 1–2 molar portions of at least one vinylidene monomer interpolymerizable with said maleic monomer, the improvement which consists essentially of (1) heatnig to at least 100° C. the maleic monomer which has dissolved therein about 0.5 to 30% by weight of a molecular regulator, said percentage being based upon the vinylidene monomer to be added in step 3, (2) agitating the maleic monomer, (3) adding to the maleic monomer a vinylidene monomer which has dissolved therein at least about 0.5% by weight of a free radical generating polymerization initiator, the addition of the vinylidene monomer being made at a rate not more than about 5 times the rate at which the added vinylidene monomer in being polymerized, and (4) maintaining the reaction mixture at a temperature of at least 100° C. until essentially all of the maleic monomer and the vinylidene monomer have polymerized; said molecular weight regulator corresponding to the formula:

wherein R is a cyclic organic radical to which =CR'R" is joined at a carbon atom of an alicyclic ring having at least 4 members, and wherein R' and R" are independently selected from the group consisting of hydrogen and an alkyl radical.

10. In a mass polymerization process for preparing a water soluble, low molecular weight interpolymer from a mixture of 1 molar portion of a maleic monomer of the group consisting of maleic anhydride, maleic acid, half esters of maleic acid and a 1–18 carbon atom monohydric alcohol, and mixtures thereof, and 1–1.5 molar portions of at least one vinylidene monomer interpolymerizable with said maleic monomer, the improvement which consists essentially of (1) heating to at least 100° C. the maleic monomer which has dissolved therein about 5–20% by weight of a molecular weight regulator, said percentage being based upon the vinylidene monomer to be added in step 3, (2) agitating the maleic monomer, (3) adding to the maleic monomer a vinylidene monomer which has dissolved therein about 1.0–4.0% by weight of a free radical generating polymerization initiator, the addition of the vinylidene monomer being made at a rate not more than about 5 times the rate at which the added vinylidene monomer is being polymerized, and (4) maintaining the reaction mixture at a temperature of at least 100° C. until essentially all of the maleic monomer and the vinylidene monomer have polymerized; said molecular weight regulator corresponding to the formula:

wherein R is a cyclic organic radical to which =CR'R" is joined at a carbon atom of an alicyclic ring having at least 4 members, and wherein R' and R" are independently selected from the group consisting of hydrogen and an alkyl radical.

11. The process of claim 10 in which the molecular rate regulator is terpinolene.

12. The process of claim 10 in which the maleic monomer is maleic anhydride and the vinylidene monomer in styrene.

13. The process of claim 10 in which the maleic monomer is at least one half ester of maleic acid and a 1–18 carbon atom monohydric alcohol and the vinylidene monomer is styrene.

14. The process of claim 13 in which the maleic monomer is methyl acid maleate.

15. The process of claim 13 in which the maleic monomer is a mixture of methyl acid maleate and secondary butyl acid maleate.

16. The process of claim 13 in which the maleic monomer is the half ester of maleic acid and the mono-n-butyl ether of ethylene glycol.

17. The product of the process of claim 1.

References Cited

UNITED STATES PATENTS

| | | | |
|---|---|---|---|
| 2,383,399 | 8/1945 | Lundquist | 260—93.3 |
| 2,556,488 | 6/1951 | Wakeford et al. | 260—93.3 |

JOSEPH L. SCHOFER, *Primary Examiner.*

J. KIGHT, *Assistant Examiner.*